US011842417B2

(12) United States Patent
Gibbon et al.

(10) Patent No.: US 11,842,417 B2
(45) Date of Patent: *Dec. 12, 2023

(54) SYSTEM AND METHOD FOR SEARCHING AND MONITORING ASSETS AVAILABLE FOR ACQUISITION

(71) Applicant: The Toronto-Dominion Bank, Toronto (CA)

(72) Inventors: Patrick Gibbon, Ancaster (CA); James Zachary Pryor, Toronto (CA); Jonathan K. Barnett, Oakville (CA); Roy D'Souza, Oakville (CA); William Stewart James Law, St. Catherines (CA); Christopher Arthur Holland McAlpine, Grimsby (CA); Ethan Christopher McAlpine, Grimsby (CA); Maria Verna, Vaughan (CA); Patrick Robert Goralski, London (CA); Cathleen Ruth Carrel, Minesing (CA); Rohan Anand, Toronto (CA); Christy Ann Dyba, Markham (CA); Dheeraj Jagtiani, Toronto (CA); Ali Hafezi, Toronto (CA); Ashkan Alavi-Harati, Markham (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,497

(22) Filed: Jul. 19, 2022

(65) Prior Publication Data

US 2022/0351312 A1 Nov. 3, 2022

Related U.S. Application Data

(63) Continuation of application No. 16/275,227, filed on Feb. 13, 2019, now Pat. No. 11,430,077.

(51) Int. Cl.
*G06Q 50/16* (2012.01)
*H04L 51/04* (2022.01)
(Continued)

(52) U.S. Cl.
CPC ............ *G06Q 50/16* (2013.01); *G06F 16/27* (2019.01); *H04L 51/04* (2013.01); *G06F 3/0484* (2013.01)

(58) Field of Classification Search
None
See application file for complete search history.

(56) References Cited

U.S. PATENT DOCUMENTS 7,076,452 B2  7/2006  Florance et al.
7,797,255 B1  9/2010  Hastings
(Continued)

FOREIGN PATENT DOCUMENTS

WO    2018/061027 A1    4/2018

OTHER PUBLICATIONS

Baldominos, A; Blanco .I; Moreno, A.J., Iturrate R., Bernardezx, Ó; Afonso, C., "Identifying Real Estate Opportunities Using Machine Learning", 2018, Applied Sciences 2018, 8, 2321 (Year: 2018).
(Continued)

*Primary Examiner* — Sarah M Monfeldt
*Assistant Examiner* — Michael J. Monaghan
(74) *Attorney, Agent, or Firm* — CPST Intellectual Property Inc.; Brett J. Slaney

(57) ABSTRACT

A system and method are provided for searching and monitoring assets available for acquisition. The method includes receiving a first signal including data associated with an acquiring entity, receiving a second signal including search data generated by the acquiring entity when interacting with at least one electronic listing service comprising searchable data associated with a plurality of assets available for
(Continued)

acquisition, storing user profile data for the acquiring entity, the user profile data comprising at least a portion of the data associated with the acquiring entity, and at least a portion of the search data. The method also includes using the user profile data to search or monitor assets listed in the at least one electronic listing service to generate a result list of matched assets and sending a third signal including an electronic notification related to the result list, to a device associated with the acquiring entity.

20 Claims, 11 Drawing Sheets

(51) Int. Cl.
*G06F 16/27* (2019.01)
*G06F 3/0484* (2022.01)

(56) References Cited

U.S. PATENT DOCUMENTS

| | | | |
|---|---|---|---|
| 7,818,219 B2 | 10/2010 | Klivington et al. | |
| 8,140,442 B2 | 3/2012 | Heyer | |
| 8,332,312 B2 | 12/2012 | Polston et al. | |
| 8,433,650 B1 | 4/2013 | Thomas | |
| 9,152,946 B2 | 10/2015 | Rankin, Jr. et al. | |
| 9,497,795 B1 | 11/2016 | Billman | |
| 9,916,366 B1* | 3/2018 | Shukla | G06F 16/248 |
| 10,002,398 B1 | 6/2018 | Isaacson | |
| 11,314,793 B2* | 4/2022 | Gallagher | G06F 3/167 |
| 2002/0049624 A1 | 4/2002 | Javeis, Jr. | |
| 2003/0101172 A1 | 5/2003 | De La Huerga | |
| 2004/0098315 A1 | 5/2004 | Haynes et al. | |
| 2004/0162773 A1 | 8/2004 | Del Rey | |
| 2008/0071769 A1 | 3/2008 | Jagannatha | |
| 2008/0201257 A1 | 8/2008 | Lewis et al. | |
| 2011/0191312 A1 | 8/2011 | Gutlapalli | |
| 2012/0269926 A1 | 10/2012 | Yu | |
| 2013/0132360 A1 | 5/2013 | Kuznetsov | |
| 2013/0138555 A1 | 5/2013 | Shishkov | |
| 2014/0365387 A1 | 12/2014 | Kiaman et al. | |
| 2015/0088670 A1 | 3/2015 | Clement | |
| 2015/0161200 A1 | 6/2015 | Barba | |
| 2016/0125036 A1* | 5/2016 | Hanson | G06F 16/435 707/733 |
| 2016/0162545 A1* | 6/2016 | Bolivar | G06F 16/24534 707/765 |
| 2016/0283517 A1 | 9/2016 | Polston | |
| 2017/0220813 A1 | 8/2017 | Mullins | |
| 2017/0372046 A1 | 12/2017 | Thomee | |
| 2018/0007169 A1 | 1/2018 | Smedberg | |
| 2018/0060421 A1* | 3/2018 | Castelli | G06F 16/3338 |
| 2018/0322597 A1 | 11/2018 | Sher | |
| 2018/0374131 A1 | 12/2018 | Currie | |
| 2019/0080425 A1 | 3/2019 | Bui | |
| 2019/0095537 A1* | 3/2019 | Zhong | G06F 16/9535 |
| 2019/0318433 A1 | 10/2019 | McGee | |
| 2020/0065877 A1* | 2/2020 | Wang | G06Q 30/0629 |

OTHER PUBLICATIONS

Bhuiyan, M. A. and Hasan, M. A., "Raven: Web-based smart home exploration system through interactive pattern discovery," 2017, 2017 IEEE International Conference on Big Data (Big Data), 2017, pp. 1390-1399 (Year: 2017).

Kirzhner, E.; Big Data Applications in Real Estate Analysis; Dec. 18, 2017; retrieved online from https:// X)deburst.io/big-data-applications-in-real-estate-analysis-502accc54dc8.

National Property Buyers; published at least as eariy as Oct. 30, 2018; retrieved online from https://www.iationalpropertybuyers.com.au/2482-2/.

Big Data and the future of Real Estate Industry; published at least as early as Oct. 30, 2018; retrieved online from ittps://www.scrapehero.com/big-data-and-the-future-of-the-real-estate-industry/.

* cited by examiner

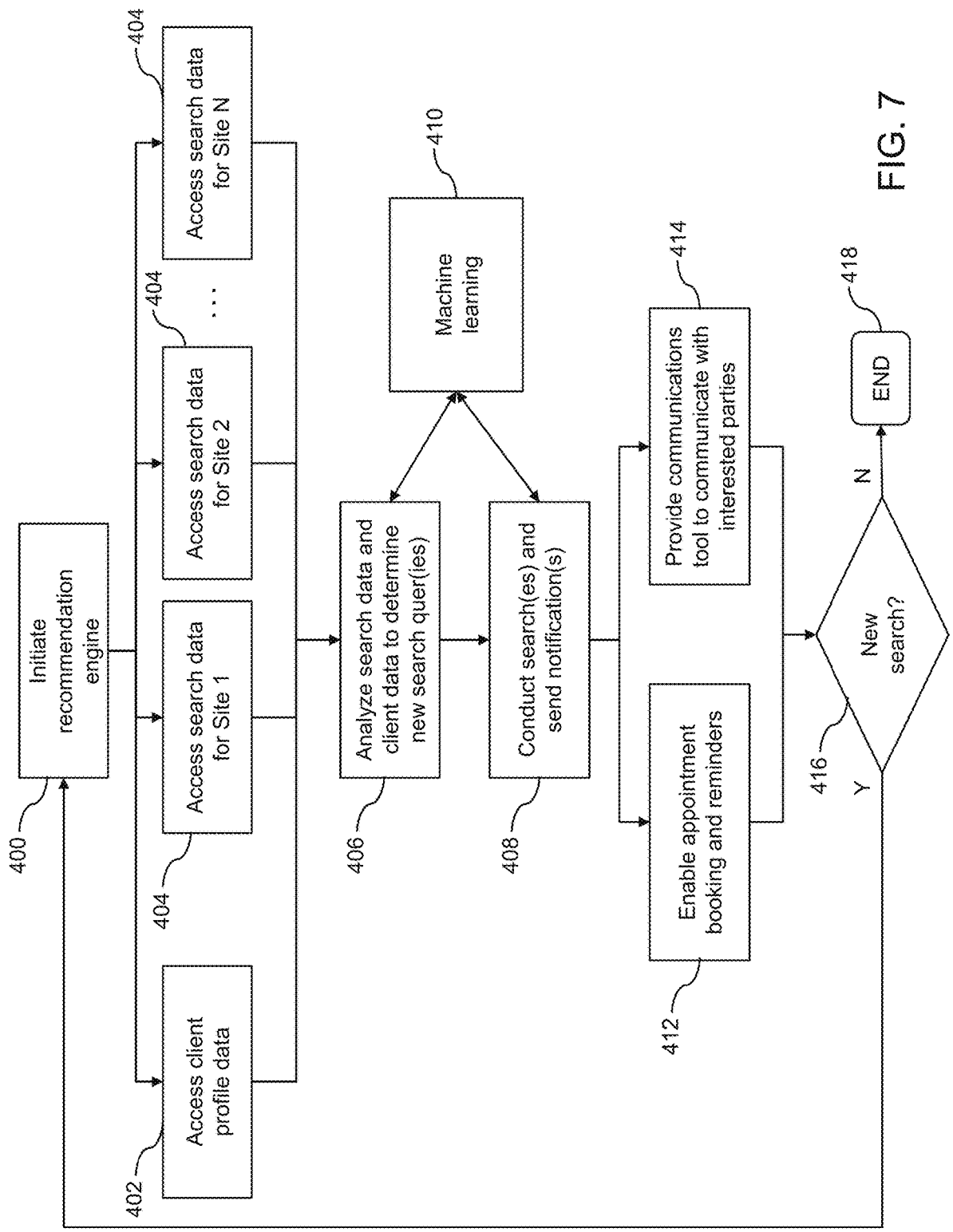

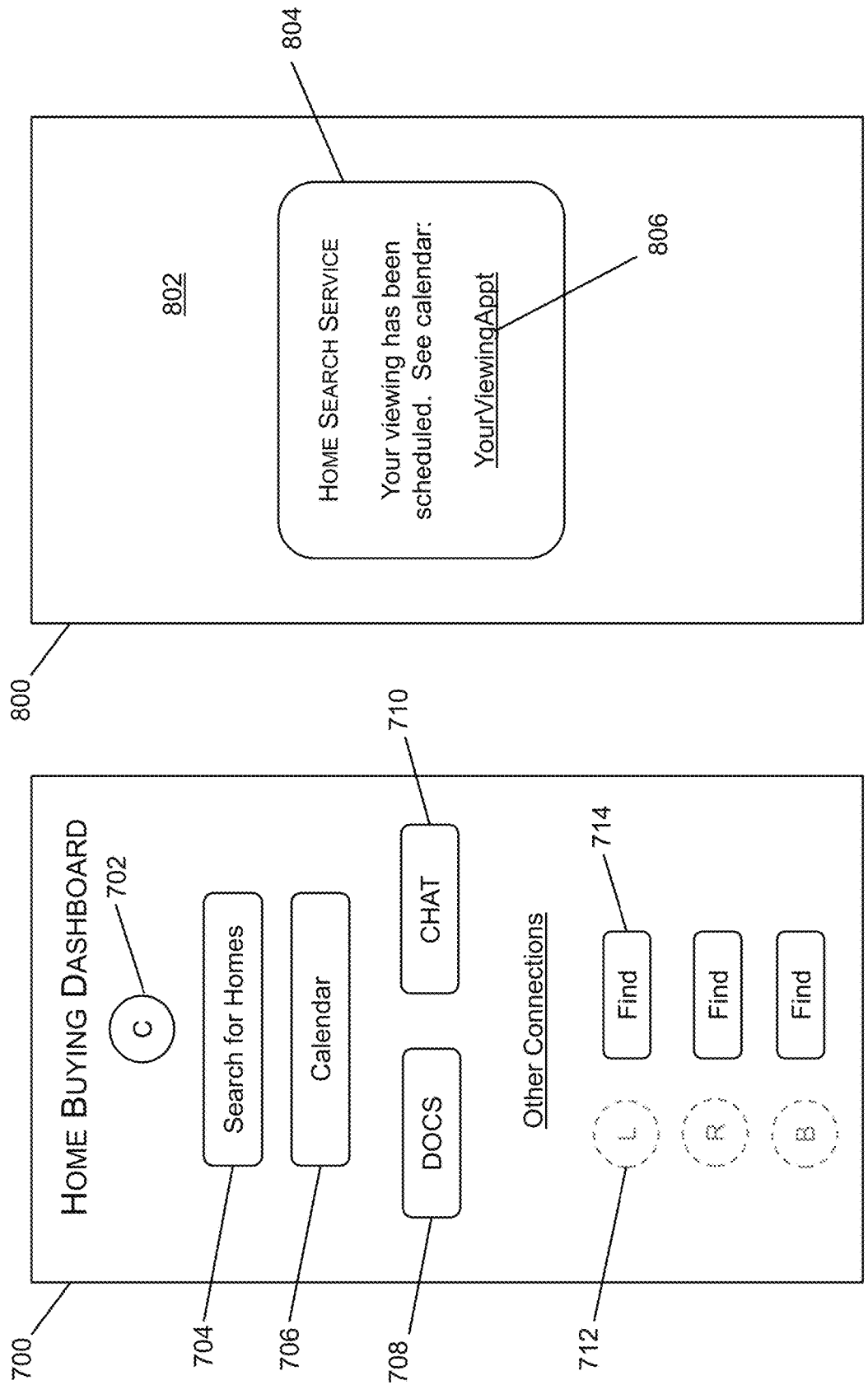

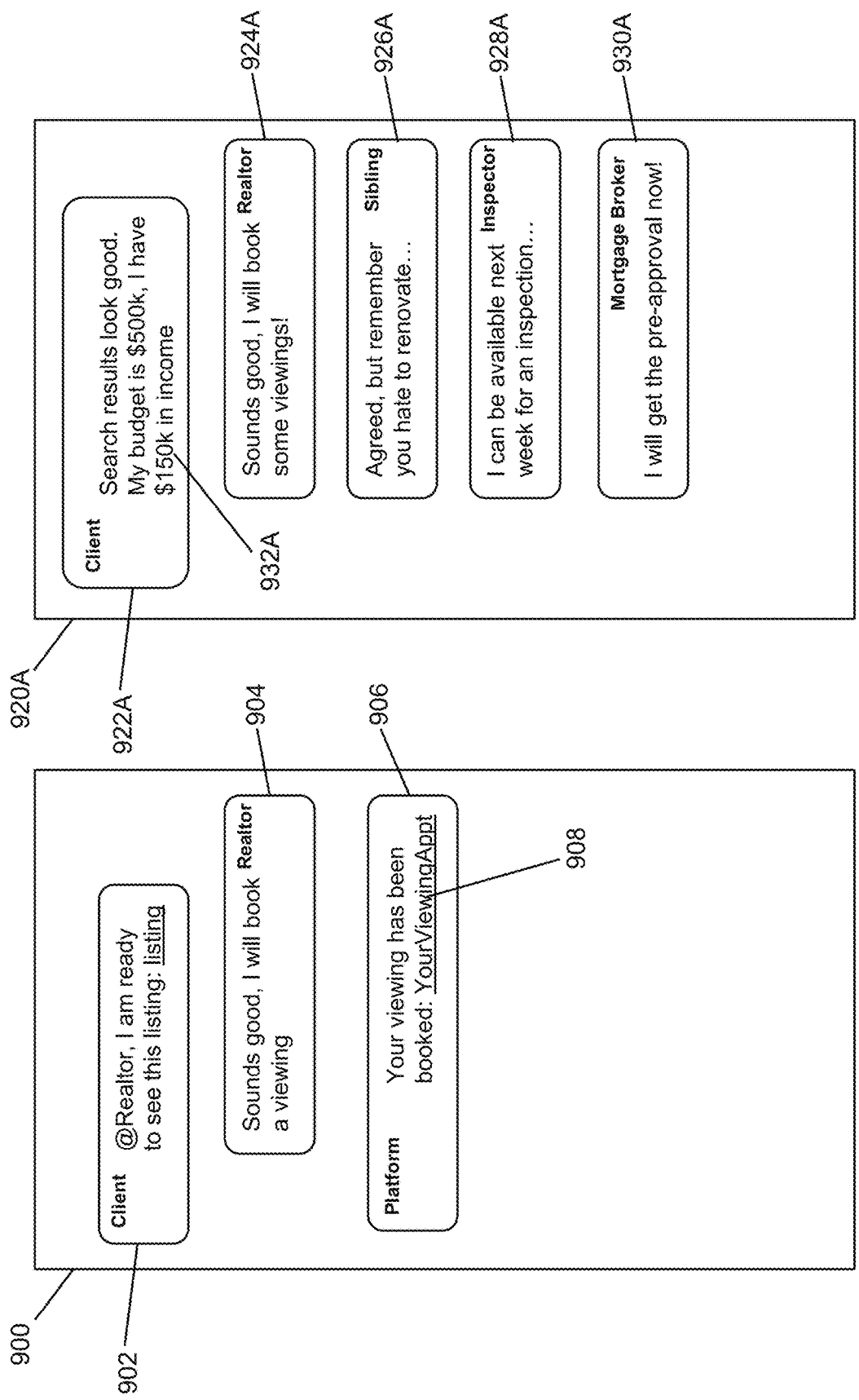

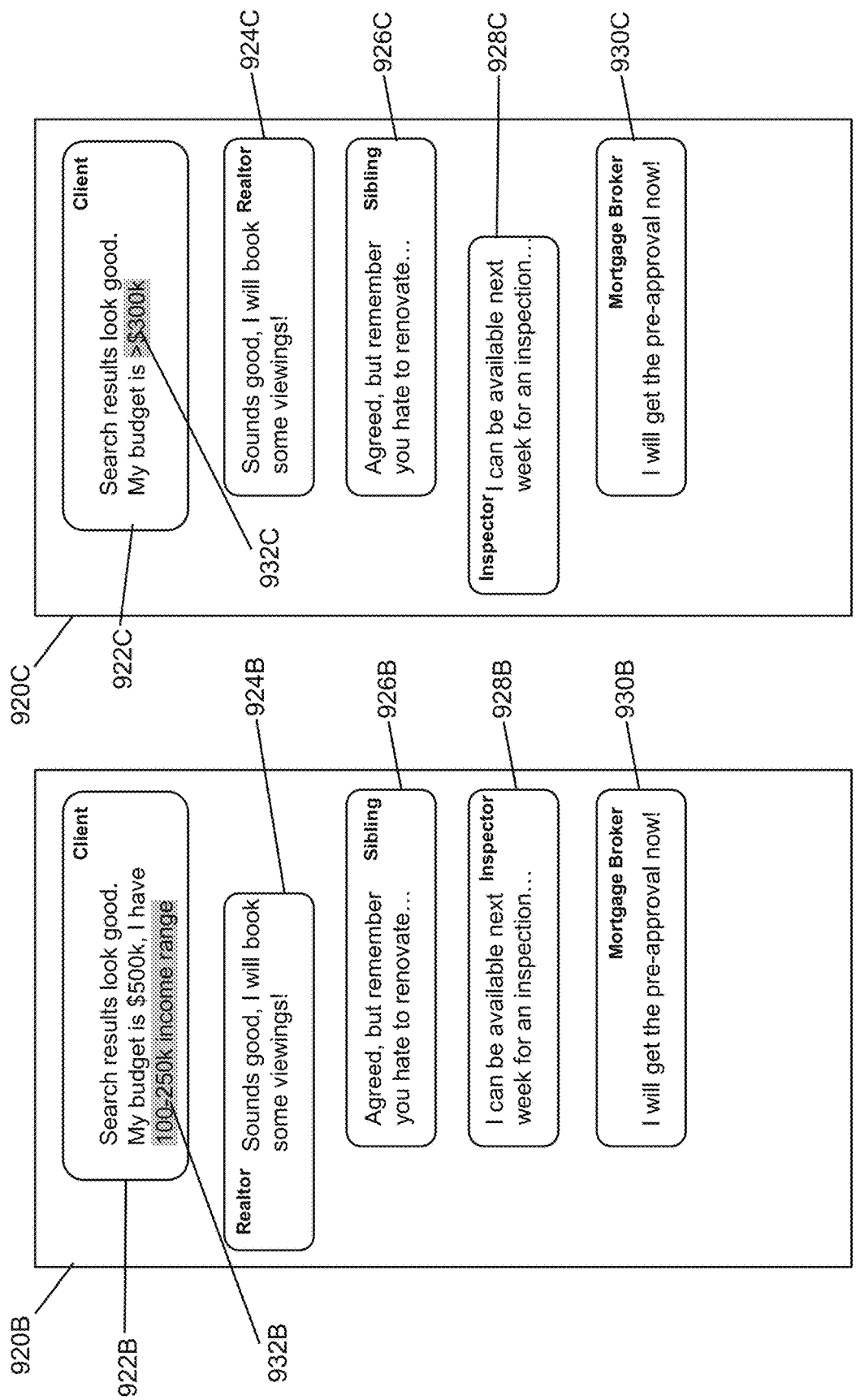

SYSTEM AND METHOD FOR SEARCHING AND MONITORING ASSETS AVAILABLE FOR ACQUISITION

CROSS-REFERENCE TO RELATED APPLICATIONS

This application is a Continuation of U.S. patent application Ser. No. 16/275,227 filed on Feb. 13, 2019, and the entire contents of which is incorporated herein by reference.

TECHNICAL FIELD

The following relates generally to searching and monitoring assets available for acquisition.

BACKGROUND

With the availability of online searchable databases of assets available for acquisition, e.g., real estate listing sites; individuals who are looking to acquire such assets have options to search and monitor listings according to various criteria. For example, individuals who are looking to purchase or lease a home or other dwelling may search and monitor listings of properties in certain desired neighborhoods. For real estate assets, potential home buyers normally hire a realtor or real estate service that may have access to more real estate data and other information relevant to a home search, in addition to his/her experience. For example, such a realtor may actively search and review new listings to present to their clients according to their understanding of the needs of each individual client. Moreover, there are typically several other tasks that a home buyer should manage at some point before, during or after locating a desired home. For example, the home buyer may need to find suitable lending such as a mortgage and hire various third-party professionals (e.g., realtors, brokers, lawyers, inspectors, and contractors). These tasks can become overwhelming and are often actively managed by the home buyers themselves.

BRIEF DESCRIPTION OF THE DRAWINGS

Embodiments will now be described with reference to the appended drawings wherein:

FIG. 7 is a flow diagram of an example of computer executable instructions for executing searching and recommendation processes.

FIG. 10 is an example of a graphical user interface of a home buying dashboard.

FIG. 11 is an example of a graphical user interface of an appointment notification.

FIG. 12 is an example of a graphical user interface of a virtual chat session with an appointment notification in a chat message.

FIG. 13 is an example of a graphical user interface of a virtual chat session from a perspective of the acquiring entity.

FIG. 14 is an example of a graphical user interface of the virtual chat session of FIG. 13, from a perspective of a realtor.

FIG. 15 is an example of a graphical user interface of the virtual chat session of FIG. 13, from a perspective of an inspector.

DETAILED DESCRIPTION

Figure 1:
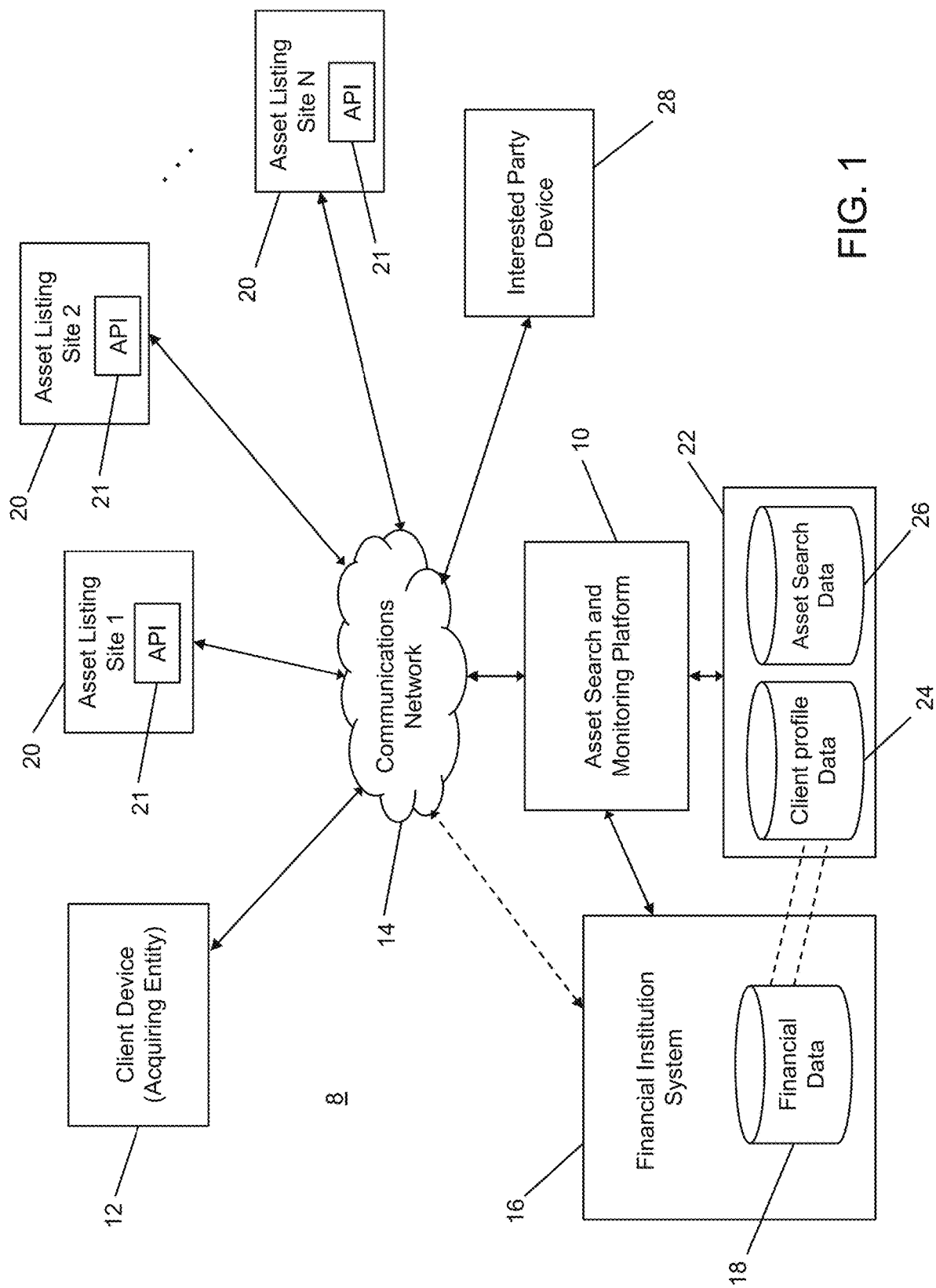
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Individuals who are looking to acquire such assets have options to search and monitor listings according to various criteria. Moreover, there are typically several other tasks that a home buyer should manage at some point before, during or after locating a desired home. There is a need for a platform or tool to assist entities looking to acquire assets (e.g., potential home buyers) during the searching and acquisition process. Such a platform may be used to automatically search for candidate listings based on profile data, financial data, search criteria, and information related to the listed assets. The platform may be used to notify acquiring entities such that the acquiring entities can be notified of additional searches, updates to listings, and be reminded of additional steps or milestones in the acquisition process.

Certain example systems and methods described herein are able to enable searching and monitoring of assets available for acquisition and to notify acquiring entities according to stored profile data. In one aspect, there is provided a device for searching and monitoring assets available for acquisition. The device includes a processor, a communications module coupled to the processor, and a memory coupled to the processor. The memory stores computer executable instructions that when executed by the processor cause the processor to receive via the communications module a first signal including data associated with an acquiring entity and receive via the communications module a second signal including search data generated by the acquiring entity when interacting with at least one electronic listing service comprising searchable data associated with a plurality of assets available for acquisition. The memory also stores computer executable instructions that when executed by the processor cause the processor to store user profile data for the acquiring entity, the user profile data comprising at least a portion of the data associated with the acquiring entity, and at least a portion of the search data. The memory also stores computer executable instructions that when executed by the processor cause the processor to use the user profile data to search or monitor assets listed in the at least one electronic listing service to generate a result list of matched assets and send via the communications module a third signal including an electronic notification related to the result list, to a device associated with the acquiring entity.

In another aspect, there is provided a method of searching and monitoring assets available for acquisition. The method is executed by a device having a processor and includes receiving via a communications module a first signal including data associated with an acquiring entity and receiving via the communications module a second signal including search data generated by the acquiring entity when interacting with at least one electronic listing service comprising searchable data associated with a plurality of assets available for acquisition. The method also includes storing user profile data for the acquiring entity, the user profile data comprising at least a portion of the data associated with the acquiring entity, and at least a portion of the search data. The method also includes using the user profile data to search or monitor assets listed in the at least one electronic listing service to generate a result list of matched assets and sending via the communications module a third signal including an electronic notification related to the result list, to a device associated with the acquiring entity.

In another aspect, there is provided non-transitory computer readable medium for searching and monitoring assets available for acquisition. The computer readable medium includes computer executable instructions for receiving via a communications module a first signal including data associated with an acquiring entity and receiving via the communications module a second signal including search data generated by the acquiring entity when interacting with at least one electronic listing service comprising searchable data associated with a plurality of assets available for acquisition. The computer readable medium also includes computer executable instructions for storing user profile data for the acquiring entity, the user profile data comprising at least a portion of the data associated with the acquiring entity, and at least a portion of the search data. The computer readable medium also includes computer executable instructions for using the user profile data to search or monitor assets listed in the at least one electronic listing service to generate a result list of matched assets and sending via the communications module a third signal including an electronic notification related to the result list, to a device associated with the acquiring entity.

In certain example embodiments, an electronic platform including a first interface for the acquiring entity may be provided, access to the at least one electronic listing service may be provided via the first interface, and the search data from interactions associated with the access to the at least one electronic listing service may be obtained via the communications module.

In certain example embodiments, the electronic notification may include at least one of statistics regarding acquisition values for assets matching particular criteria, a listing for a particular asset, an indication that a previously searched asset has been acquired.

In certain example embodiments, the user profile data may be periodically updated to account for changes in the data associated with the acquiring entity.

In certain example embodiments, the data associated with the acquiring entity may include a financial viability metric associated with a value or value range for the assets being searched.

In certain example embodiments, an electronic platform including a first interface for the acquiring entity may be provided and a graphical user interface including at least one element associated with an acquisition process for a selected asset may also be provided. The graphical user interface may provide at least one reminder associated with a step in the acquisition process. The graphical user interface may also provide an appointment tool for scheduling at least one event associated with the acquisition process. The electronic platform may provide at least one interface to connect the acquiring entity with at least one advisor entity, the at least one advisor entity being scheduled for the at least one event using the appointment tool.

In certain example embodiments, a chatroom interface may be provided to enable at least one secondary participant to correspond with the acquiring entity. Visibility of at least one message in a chat based on a secondary participant type may be controlled. The at least one message may include financial data.

In certain example embodiments, an electronic platform including a first interface for the acquiring entity may be provided and the acquiring entity may be enabled to connect to at least one advisor entity using the first interface. At least one recommendation may be generated for the at least one advisor.

In certain example embodiments, the plurality of assets may be dwellings to be purchased or leased.

FIG. 1 illustrates an exemplary computing environment 8. In one aspect, the computing environment 8 may include an asset search and monitoring platform 10 (referred to as "the platform 10" hereinafter), one or more client devices 12, and a communications network 14 connecting one or more components of the computing environment 8. The computing environment 8 may also include one or more asset listing sites 20. In the example shown in FIG. 1, N asset listing sites 20 are shown and each asset listing site 20 may be associated with one or more asset searching services (e.g., one or more real estate listing services). Each asset listing site 20 may include an application programming interface (API) 21 for interfacing with the platform 10 via the network 14.

The computing environment 8 may also include on or more interested party devices 28. It will be appreciated that the interested party devices 28 may be considered similar or the same as the client devices 12 but in this example embodiment are associated with other parties that are not necessarily an acquiring entity and support or otherwise participate in an asset purchasing process of a certain acquiring entity using a client device 12 in the computing environment. It will be appreciated that an interested party may also be an acquiring entity in other circumstances. Similarly, an acquiring entity may also be an interested third party for another acquiring entity.

The computing environment 8 may also include a financial institution system 16 (e.g., commercial bank) that provides financial services accounts to users and processes financial transactions associated with those financial service accounts. While several details of the financial institution system 16 have been omitted for clarity of illustration, shown in FIG. 1 is a datastore (also referred to as a database, memory or memory element) that stores financial data 18.

The financial data 18 may be associated with users of the client devices 12 (who may also be interested parties in some example embodiments). The financial data 18 may include any data related to or derived from financial values or metrics associated with customers of the financial institution 16, for example, account balances, transaction histories, line of credit available, credit scores, mortgage balances, affordability metrics, investment account balances, investment values and types, among many others. The financial data 18 may also be associated with users of the interested party devices 28.

The computing environment 8 may also include a datastore 22. In the example shown in FIG. 1, the datastore 22 may be used to store client profile data 24 and asset search data 26. The client profile data 24 may be used to store data accumulated by or provided to the platform 10 and which is associated with a user of a client device 12. The client profile data 24 may be mapped to corresponding financial data 18 for that user (as illustrated using dashed lines in FIG. 1) and/or may include some of the financial data 18. The client profile data 24 can include both data that is associated with a client as well as data that is associated with one or more user accounts for that client as recognized by the platform 10. The data associated with a client may include, without limitation, demographic data (e.g., age, gender, income, location, etc.), preference data input by the client (e.g., hobbies, likes, dislikes, etc.), and inferred data generated through machine learning, modeling, pattern matching, or other automated techniques. The client profile data 24 may also include historical interactions and transactions associated with the platform 10, e.g., login history, search history, communication logs, document sharing metrics, etc. The client profile data 24 may also include documents, media content or other files that are being shared on the platform 10 or otherwise stored for the client.

The asset search data 26 includes search criteria, search results, and other information related to one or more of the asset listing search sites 20 and may be organized per client device 12. That is, for each acquiring entity associated with a client device 12, a set of asset search data 26 may be stored to track searches conducted by the acquiring entity, results from those searches, search criteria used by the platform 10 to automatically search on behalf of the acquiring entity, and any other information or credentials for utilizing the asset listing sites 20. For example, the platform 10 may be given permission by the acquiring entity to store user login credentials for user accounts associated with one or more of the asset listing sites 20 to provide further personalization of the searching and monitoring operations performed by the platform 10. The API 21 may be used by the platform 10 to establish connectivity and permit such personalized access to the asset listing sites 20. The asset search data 26 may be updated and refined over time by monitoring searching activities conducted by the client devices 12 on the asset listing sites 20 or by tracking searching and monitoring activities performed by the platform 10 on behalf of the acquiring entities.

It can be appreciated that the datastore 22 is shown separately from the platform 10 for illustrative purposes only and may also be at least partially stored within a database, memory, or portion thereof within the platform 10. It can also be appreciated that while the platform 10 and financial institution system 16 are shown as separate entities in FIG. 1, they may also be part of the same system. For example, the platform 10 can be hosted and provided within the financial institution system 16.

Client devices 12 may be associated with one or more users. Users may be referred to herein as acquiring entities, homebuyers, or other entities associated with an exchange activity such as a home buying process. The computing environment 8 may include multiple client devices 12, each client device 12 being associated with a separate user or with one or more users. In certain embodiments, a user may operate client device 12 such that client device 12 performs one or more processes consistent with the disclosed embodiments. For example, the user may use client device 12 to engage and interface with the platform 10 and asset listing sites 20 to assist in purchasing a home. The client device 12 may also engage and interface with users of the interested party devices 28, e.g., friends, family, co-workers, advisors such as realtors or mortgage brokers, etc. Similarly, the client device 12 may engage and interface with the financial institution system 16 for activities both related and unrelated to searching and acquiring assets available for acquisition. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12 and different types of asset listing sites 20 and interested party devices 28. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, platform 10 may be one or more computer systems configured to process and store information and execute software instructions to perform one or more processes consistent with the disclosed embodiments. In certain embodiments, although not required, platform 10 may be associated with one or more business entities. In certain embodiments, platform 10 may represent or be part of any type of business entity. For example, platform 10 may be a system associated with a commercial bank (e.g., financial institution system 16), a retailer, or some other type of business.

Referring back to FIG. 1, the platform 10 and/or financial institution system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the platform 10 and financial institution system 16. The cryptographic server may be used to protect the financial data 18, client profile data 24, and asset search data 26 by way of encryption for data protection, digital signatures or message digests for data integrity, and by using digital certificates to authenticate the identity of the users and client devices 12, interested party devices 28, and asset listing sites 20 with which the platform 10 communicates to inhibit data breaches by adversaries. It can be appreciated that various cryptographic mechanisms and protocols can be chosen and implemented to suit the constraints and requirements of the particular deployment of the platform 10 as is known in the art.

Figure 2:
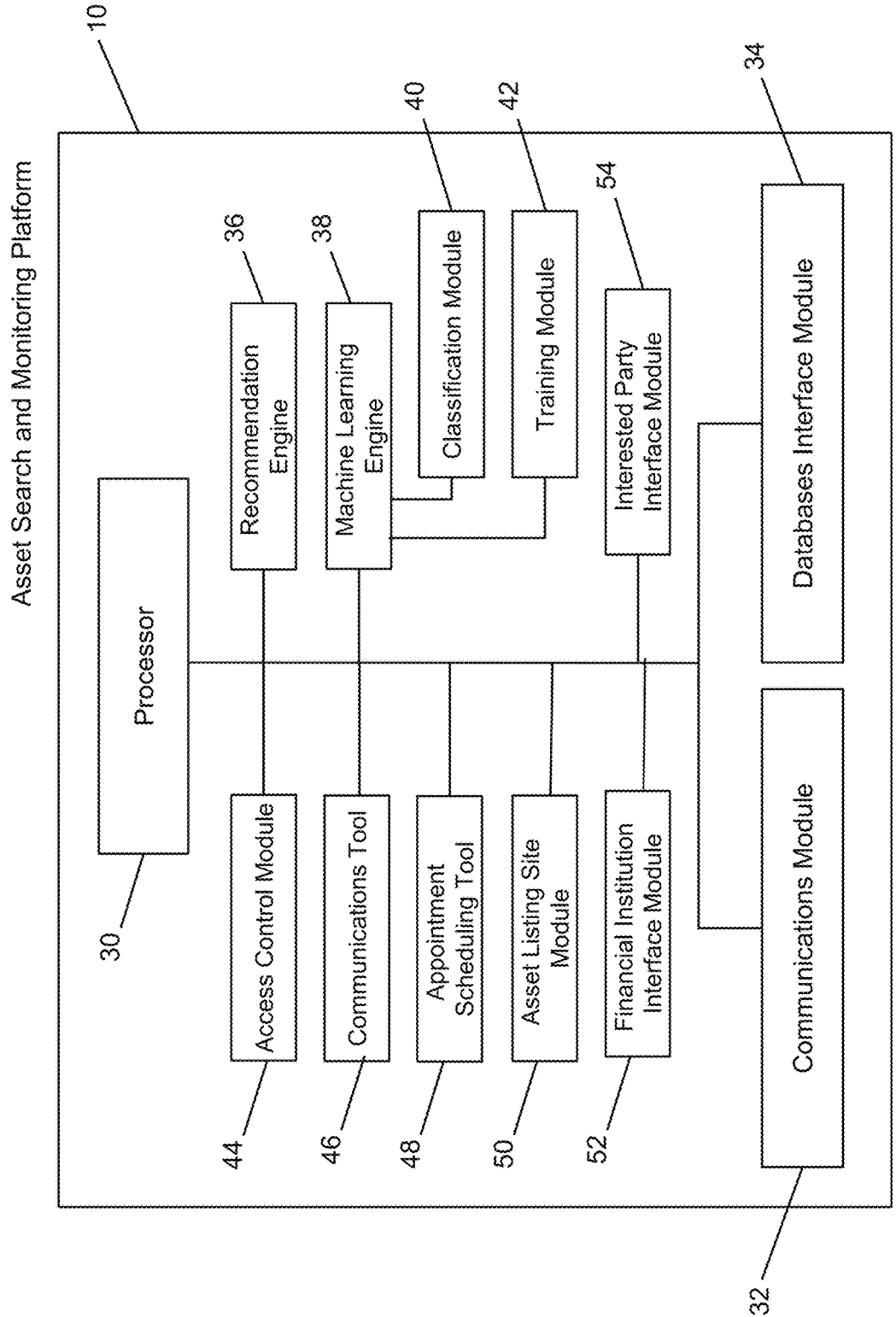
FIG. 2 is a block diagram of an example configuration of an asset search and monitoring platform.

In FIG. 2, an example configuration of the platform 10 is shown. In certain embodiments, the platform 10 may include one or more processors 30, a communications module 32, and a database interface module 34 for interfacing with the datastore 22 to retrieve and store data. Communications module 32 enables the platform 10 to communicate with one or more other components of the computing environment 8, such as client device 12, interested party devices 28, financial institution system 16 or asset search sites 20 (or one of its components), via a bus or other communication network, such as the communication network 14. While not delineated in FIG. 2, the platform 10 includes at least one memory or memory device that can include a tangible and non-transitory computer-readable medium having stored therein computer programs, sets of instructions, code, or data to be executed by processor 30. FIG. 2 illustrates examples of modules, tools and engines stored in memory on the platform 10 and operated by the processor 30. It can be appreciated that any of the modules, tools, and engines shown in FIG. 2 may also be hosted externally and be available to the platform 10, e.g., via the communications module 32. In the example embodiment shown in FIG. 2, the platform 10 includes a recommendation engine 36, a machine learning engine 38, a classification module 40, a training module 42, an access control module 44, a communications tool 46, an appointment scheduling tool 48, an asset listing site module 50, a financial institution interface module 52, and an interested party interface module 54.

The recommendation engine 36 is used by the platform 10 to generate one or more search recommendations for a client device 12. The recommendation engine 36 can access the client profile data 24 and asset search data 26 via the databases interface module 34 and apply one or more matching processes to generate the recommendation(s). The recommendation engine 36 may also have access to financial data 18 associated with the acquiring entity, which may be provided via the financial institution interface module 52. The recommendation engine 36 may utilize or otherwise interface with the machine learning engine 38 to both classify data currently being analyzed to generate a recommendation, and to train classifiers using data that is continually being processed and accumulated by the platform 10.

The machine learning engine 38 may also perform operations that classify the client profile data 24 and asset search data 26 in accordance with corresponding classifications parameters, e.g., based on an application of one or more machine learning algorithms to each of the groups of profile data 24, 26 (also referred to herein as "profile content"). The machine learning algorithms may include, but are not limited to, a one-dimensional, convolutional neural network model (e.g., implemented using a corresponding neural network library, such as Keras®), and the one or more machine learning algorithms may be trained against, and adaptively improved using, elements of previously classified profile content identifying suitable search criteria and/or suitable matches between users and assets such as homes listed by the asset listing services 20. Subsequent to classifying the profile content, the recommendation engine 36 may further process each element of the profile content to identify, and extract, a value characterizing the corresponding one of the classification parameters, e.g., based on an application of one or more additional machine learning algorithms to each of the elements of the profile content. By way of the example, the additional machine learning algorithms may include, but are not limited to, an adaptive natural language processing algorithm that, among other things, predicts starting and ending indices of a candidate parameter value within each element of profile content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified profile content. Classification parameters may be stored and maintained using the classification module 40, and training data may be stored and maintained using the training module 42.

In some instances, classification data stored in the classification module 40 may identify one or more parameters, e.g., "classification" parameters, that facilitate a classification of corresponding elements or groups of recognized profile content based on any of the exemplary machine learning algorithms or processes described herein. The one or more classification parameters may correspond to parameters that can indicate a suitability or compatibility between users and potential assets available for acquisition. For example, a target geographical area preference for a user's homebuying search can be correlated or deemed compatible or not with certain geographical areas associated with search results.

In some instances, the additional, or alternate, machine learning algorithms may include one or more adaptive, natural-language processing algorithms capable of parsing each of the classified portions of the profile content and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of profile content (e.g., an address used in a real estate listing search) and a single classification parameter (e.g., a region of interest) and additionally, or alternatively, multiple classification parameters (e.g., a property tax level and a region of interest).

Based on the output of the one or more machine learning algorithms or processes, such as the one-dimensional, convolutional neural network model described herein, machine learning engine 38 may perform operations that classify each of the discrete elements of profile content as a corresponding one of the classification parameters, e.g., as obtained from classification data stored by the classification module 40.

The outputs of the machine learning algorithms or processes may then be used by the recommendation engine 36 to find one or more search criteria for monitoring, searching, and recommending available assets for the acquiring entity to acquire. The outputs of the machine learning algorithms may also include recommended ones of the listings from a given set of search results. As discussed in greater detail below, the searching and monitoring processes implemented by the recommendation engine 36 may operate based on search activities of the acquiring entity, or automatically on behalf of the acquiring entity, or both. For example, the recommendation engine 36 may learn search criteria and preferences from search activities conducted by the acquiring entity and then subsequently refine those search criteria based on data stored by the platform 10 and conduct additional searches using the same or different asset listing sites 20. For example, the platform 10 may use search criteria used by an acquiring entity searching on a first asset listing site 20 to generate a suitable set of search criteria to be used by the platform 10 on one or more second asset listing sites 20.

Referring again to FIG. 2, the access control module 44 may be used to apply a hierarchy of permission levels or otherwise apply predetermined criteria to determine what profile data can be shared with which entity in the computing environment 8. For example, the platform 10 may have been granted access to certain sensitive financial data 18 for a user, which is associated with a certain client device 12 in the computing environment 8. When communicating with the interested party devices 28 or asset listing sites 20, such access control measures can be applied to restrict the sharing of information with such entities.

Similarly, the client profile data 24 may include potentially sensitive information such as age, date of birth, or nationality, which the acquiring entity may not wish to have shared. For example, a realtor (as an example of an interested party in this example) may not require financial data 18 until forms are required for a bid or mortgage pre-approval, whereas some general personal information may be required to engage in a realtor representation agreement. As such, the access control module 44 can be used to control the sharing of certain client profile data 24 (and/or financial data 18) based on events in the searching and acquisition process. That is, different relationships between the acquiring entity and other entities in the computing environment 8 may require different levels of access to data stored by the platform 10 and the access control module 44 may be configured to control how much information is shared and with whom.

It will be appreciated that events representing or causing changes in these relationships can trigger different levels of access control to the client profile data 24 and/or financial data 18. This can include providing additional integration between the acquiring entity and the interested parties, in response to events indicative of a deeper or more formalized relationship (e.g., with advisor entities configured to communicate via the platform 10).

The platform 10 may also include a communications tool 46 that is provided to enable entities in the computing environment 8 to communicate with each other, e.g., via an instant messaging or chat interface. The platform 10 may also include an appointment scheduling tool 48 to enable the platform 10 to generate appointments and reminders related to certain events related to the asset acquisition process. It will be appreciated that the appointment scheduling tool 48 may be configured to interface with existing calendar applications and existing scheduling tools to create new appointments and reminders that work within existing infrastructure. For example, the platform 10 can be used to create a home viewing appointment, or a reminder to seek a pre-approval for a mortgage based on search activities and actions related to the home buying process. The communications tool 46 and the appointment scheduling tool 48 may include their own access control functionality or may utilize and coordinate with the access control module 44 for such functionality.

It can be appreciated that the delineation between the access control module 44, communications tool 46, and appointment scheduling tool 48 as shown in FIG. 2 is for illustrative purposes. The platform 10 may also include an asset listing site module 50 that may interface with the asset listing sites 20 via the API 21 to connect acquiring entities to the asset listing sites 20 and to monitor and track searching activities and search results obtained through those sites 20, which can initiate the recommendation engine 36 to determine additional search criteria, conduct additional searches, and provide recommended listings in notifications to the acquiring entity.

The platform 10 may also include a financial institution interface module 52 to provide a graphical user interface (GUI) or application programming interface (API) connectivity to communicate with the financial institution system 16 to obtain financial data 18 for a certain user. The platform 10 may also include an interested party interface module 54 to control access to the platform 10 for interested parties that are associated with a particular client device 12. For example, the interested party interface module 54 may maintain a list of approved interested parties that may access chat sessions and communicate with the acquiring entity via the platform 10. It can be appreciated that the asset listing site module 50, financial institution module 52 and interested party interface module 54 may also provide a web browser-based interface, an application or "app" interface, a machine language interface, etc.

Figure 3:
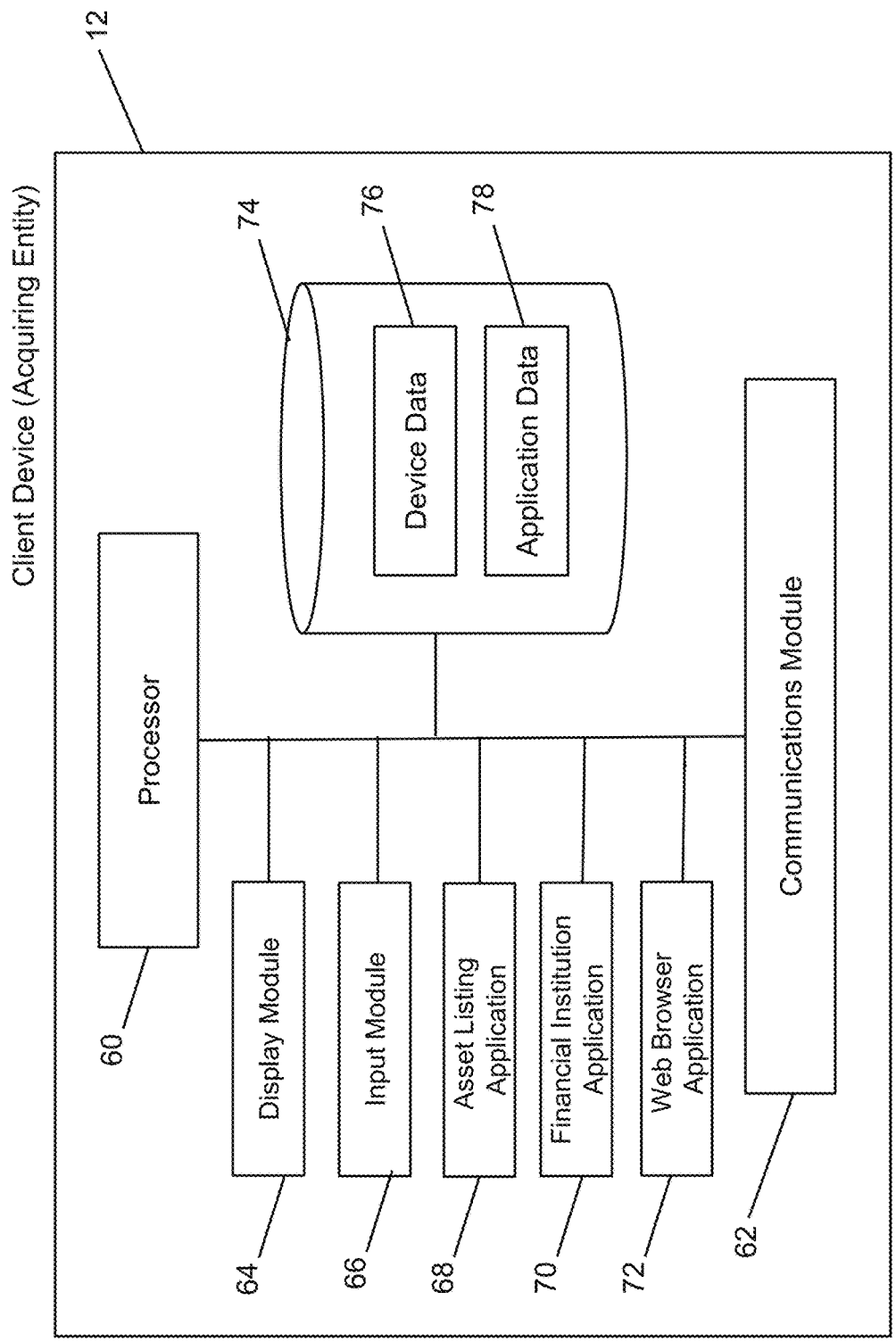
FIG. 3 is a block diagram of an example configuration of a client computing device associated with an acquiring entity.

In FIG. 3, an example configuration of the client device 12 is shown. In certain embodiments, the client device 12 may include one or more processors 60, a communications module 62, and a data store 74 storing device data 76 and application data 78. Communications module 62 enables the client device 12 to communicate with one or more other components of the computing environment 8, such as platform 10, interested party devices 28 or asset listing sites 20 (or one of its components), via a bus or other communication network, such as the communication network 14. While not delineated in FIG. 3, the client device 12 includes at least one memory or memory device that can include a tangible and non-transitory computer-readable medium having stored therein computer programs, sets of instructions, code, or data to be executed by processor 60. Fla 3 illustrates examples of modules and applications stored in memory on the client device 12 and operated by the processor 60. It can be appreciated that any of the modules and applications shown in FIG. 3 may also be hosted externally and be available to the client device 12, e.g., via the communications module 62.

In the example embodiment shown in FIG. 3, the client device 12 includes a display module 64 for rendering GUIs and other visual output on a display device such as a display screen, and an input module 66 for processing user or other inputs received at the client device 12, e.g., via a touch-screen, input button, transceiver, microphone, keyboard, etc. The client device 12 may also include an asset listing application 68, which may be a customized app provided by the platform 10 for use by the entities in the computing environment 8. Similarly, the client device 12 may include a financial institution application 70 provided by their financial institution system 16, e.g., for performing mobile banking operations. The client device 12 in this example embodiment also includes a web browser application 72 for accessing Internet-based content, e.g., via a mobile or traditional website. The data store 74 may be used to store device data 76, such as, but not limited to, an IP address or a MAC address that uniquely identifies client device 12 within environment 8. The data store 74 may also be used to store application data 78, such as, but not limited to, login credentials, user preferences, cryptographic data (e.g., cryptographic keys), etc.

It will be appreciated that only certain modules, applications; tools and engines are shown in FIGS. 2 and 3 for ease of illustration and various other components would be provided and utilized by the client device 12 and platform 10 as is known in the art. It will also be appreciated that the configuration of the asset listing sites 20 and interested party devices 28 may be similar to that shown in FIG. 2 or 3, including the inclusion of an asset listing application 68 and its functionality.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers in platform 10 or financial institution system 16, client device 12, or interested party device 28, or accessible or connectable thereto. Any application or module herein described may be implemented using computer readable/executable instructions that may be stored or otherwise held by such computer readable media.

Figure 4:
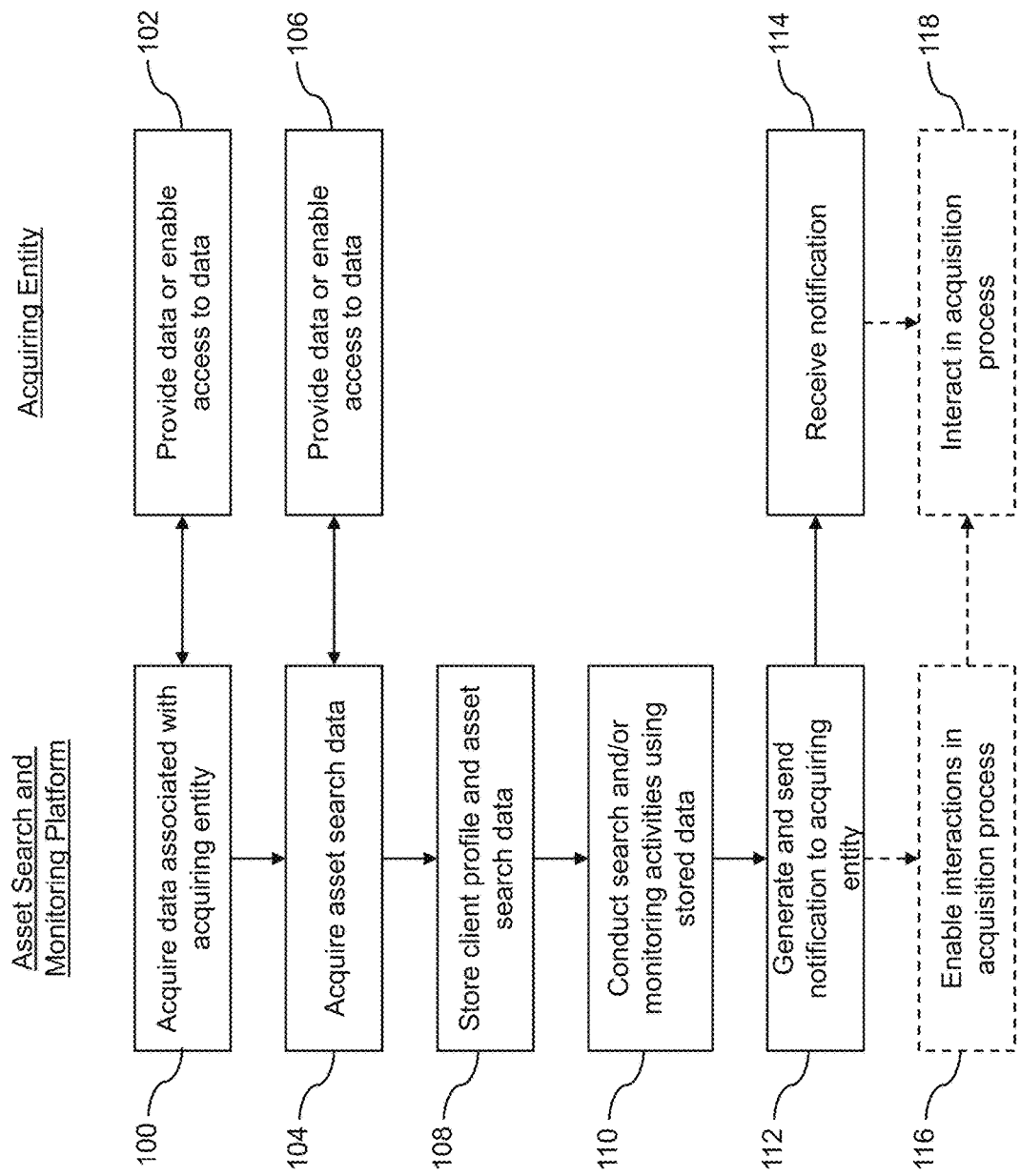
FIG. 4 is a flow diagram of an example of computer executable instructions for conducting search and monitoring of assets available for acquisition and notifying acquiring entities of search results.
Figure 5:
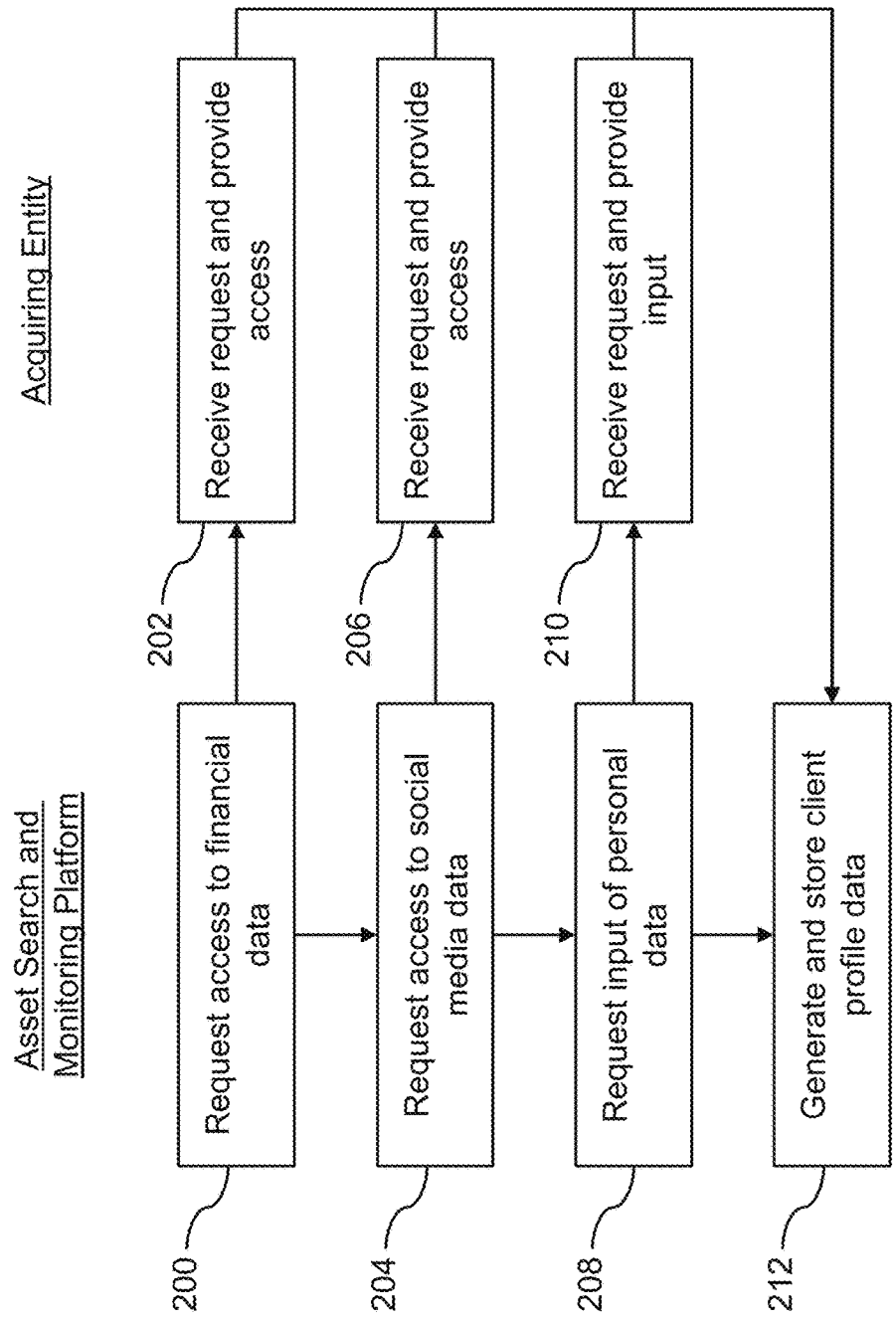
FIG. 5 is a flow diagram of an example of computer executable instructions for obtaining access to data for populating a client profile.

Referring to FIG. 4, an example embodiment of computer executable instructions for conducting search and monitoring of assets available for acquisition and notifying acquiring entities of search results is shown. At block 100, the platform 10 acquires data associated with the acquiring entity to populate the client profile data 24. The data associated with the acquiring entity may have been provided previously, e.g., upon registering with the platform 10 and/or may be periodically acquired automatically or in communication with the acquiring entity. In this example embodiment, the acquiring entity provides such data or enables access to such data at block 102. Examples of providing or enabling access to such user or client data is illustrated in FIG. 5 described below.

Figure 6:
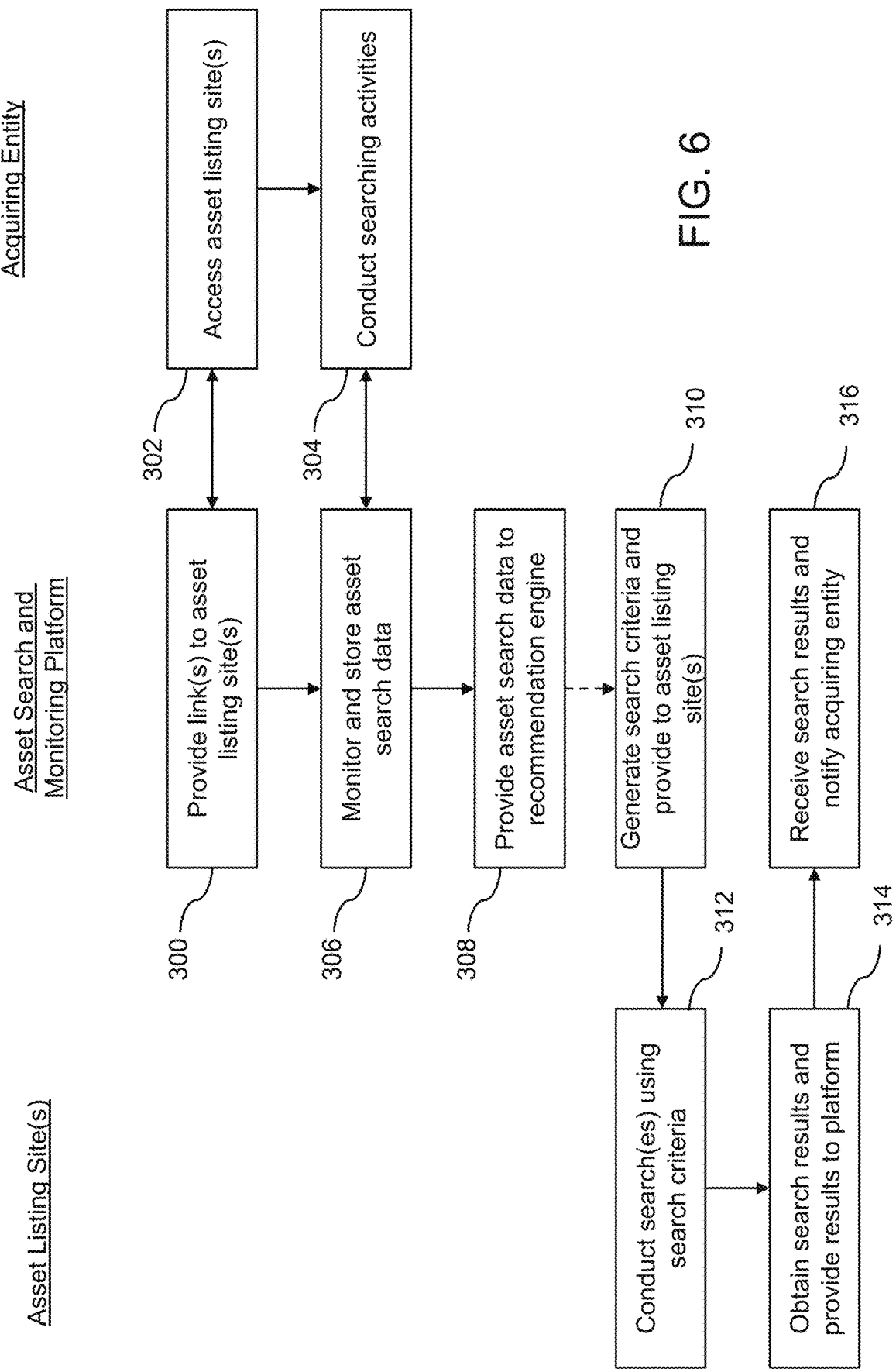
FIG. 6 is a flow diagram of an example of computer executable instructions for monitoring search activities by an acquiring entity and providing search criteria to an asset listing site for obtaining new search results.

At bock 104, the platform acquires asset search data, e.g., home listing search data. This asset search data is acquired to populate the asset search data 26. In this example embodiment, the acquiring entity provides the asset search data or enables access to the data, e.g., by providing login credentials to an asset listing site 20 used by the acquiring entity at block 106. The acquiring entity may also connect or link to certain asset listing sites 20 via the platform 10 and provide suitable permissions to enable the platform 10 to monitor interactions with those certain asset listing sites 20. An example of providing or enabling access to such search data is illustrated in FIG. 6 described below.

At block 108, the platform 10 stores client profile data 24 and asset search data 26 for the acquiring entity in the datastore 22. Obtaining data from the acquiring entity may include obtaining access to the financial data 18 for the acquiring entity and at least some of this financial data 18 may be stored in the client profile data 24. It will be appreciated that in example embodiments where the financial institution system 16 hosts the platform 10, the financial data 18 may already be available to the platform 10.

At block 110, the platform 10 uses the recommendation engine 36 to conduct searching and/or monitoring activities used the stored client profile data 24, asset search data 26, and financial data 18. Based on the activities conducted by the recommendation engine 36, the platform 10 may generate and send one or more notifications to the acquiring entity at block 112. For example, the platform 10 may generate search criteria and access an asset listing site 20 not previously used by the acquiring entity to provide a search result list associated with that asset listing site 20. Similarly, the recommendation engine 36 may be used to generate a refined set of search criteria to periodically monitor one or more asset listing sites 20 to provide ongoing search results to the acquiring entity.

Figure 9:
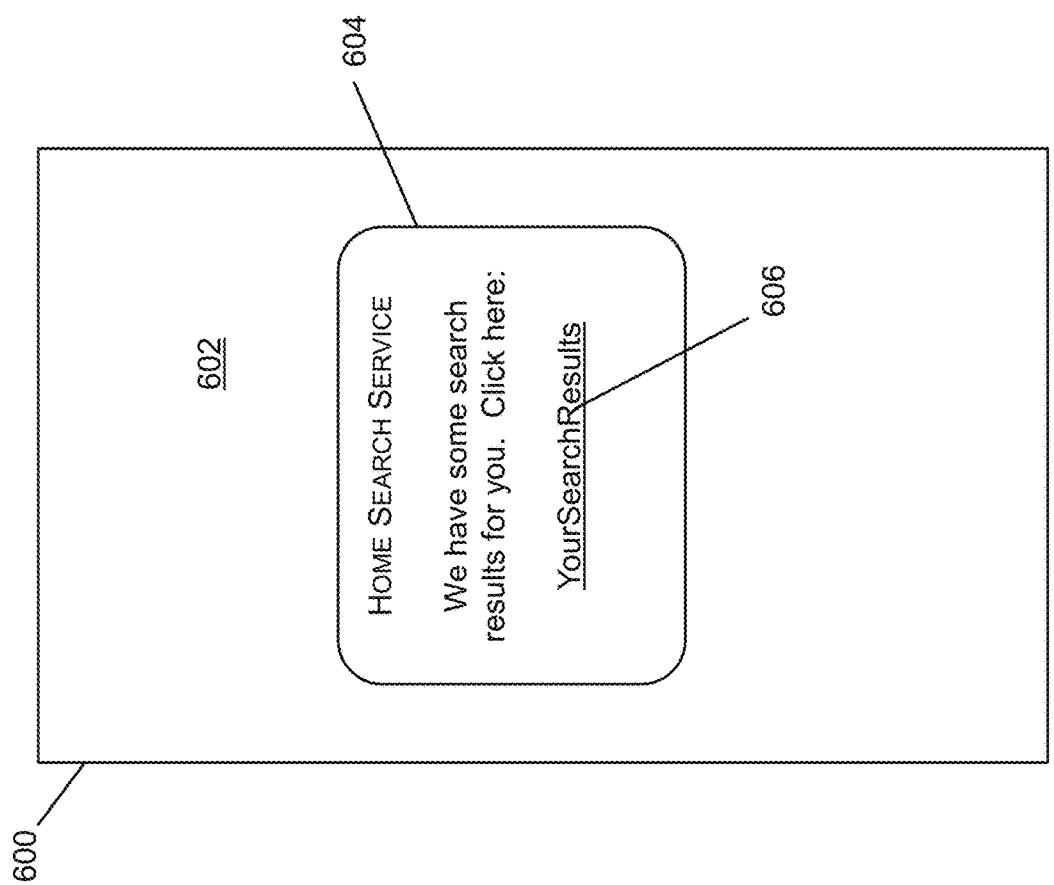
FIG. 9 is an example of a graphical user interface of a search notification.

At block 114, the acquiring entity receives the notification, e.g., via the asset listing application 68, financial institution application 70, web browser application 72 or other application on the client device 12. The notification may be delivered by way of an existing communication type such as an email, text message or alert, or may be delivered using a custom pop-up message or other visual element on the client device 12 or another device associated with that acquiring entity. An example of such a notification is shown in FIG. 9 and described below.

The platform 10 may also be configured to assist the acquiring entity not only with searching and monitoring assets available for acquisition, but also to interact or engage in the acquisition process, e.g., to initiate a home buying process by incorporating interested parties such as realtors, lawyers, inspectors, mortgage brokers, etc. At block 116, the platform enables interactions in the acquisition process, which enables the acquiring entity to interact in the acquisition process at block 118, e.g., by initiating a chat with a realtor to schedule a viewing of a property found by the platform 10 in conducting the monitoring and searching activities described herein.

The platform 10 may obtain access to certain client profile data 24 that is associated with an acquiring entity, e.g., at block 102 in FIG. 4. Referring to FIG. 5, an example embodiment of computer executable instructions for obtaining access to data for populating a client profile is shown.

At block 200 the platform 10 requests access to financial data 18 and provides this request to the acquiring entity. At block 202 the acquiring entity receives the request for financial data 18 and provides access to the platform 10 in this example embodiment. It can be appreciated that the financial data 18 can be accessed directly when the platform 10 is associated with or provided directly by the financial institution system 16. The financial data 18 may also be entered by the acquiring entity when establishing a profile with the platform 10, e.g., via a questionnaire or other input mechanism. Full or partial access to the financial institution system 16 may also be provided to enable the client profile data 24 to have access to current and periodically changing financial data 18.

At block 204 the platform 10 requests access to social media data to obtain preferences and personality traits, searching and viewing histories, "likes", reposts, among other things, and provides this request to the acquiring entity. At block 206 the acquiring entity receives the request for social media data and provides access to the platform 10 in this example embodiment. Providing access in this example embodiment may include providing sign-in credentials or a permission to enable the platform 10 to directly access the social media data automatically and periodically. The permission may be an opt-in by the acquiring entity that the platform 10 can utilize publicly available social media data for that user. Access to private social media data can also be provided with the credentials.

At block 208 the platform 10 requests the input of certain personal data, to obtain other preferences and personality traits, or other data not available through social media, and provides this request to the acquiring entity. At block 210 the acquiring entity receives the request for the input of personal data and provides input to the platform 10 in this example embodiment. Providing input of personal information may include a questionnaire or survey or other input mechanism provided to the acquiring entity, e.g., via the realtor referral and interface application 68.

At block 212 the platform 10 generates and stores the client profile data 24 for that acquiring entity via the databases interface module 34. The process shown in FIG. 5 may be initiated when registering a new user, periodically performed to update and refresh the client profile data 24, or both.

The platform 10 may also provide access to, or otherwise be associated with the asset listing sites 20 to enable the platform 10 to monitor search activities of the acquiring entity and to generate its own search criteria and conduct monitoring and searching activities on behalf of the acquiring entities, e.g., in part illustrated at block 106 in FIG. 4. Referring to FIG. 6, an example embodiment of computer executable instructions for monitoring search activities by an acquiring entity and providing search criteria to an asset listing site for obtaining new search results. At block 300, the platform provides one or more links to asset listing sites 20 to enable the acquiring entity to access one or more of these asset listing sites 20 at block 302, e.g., using the client device 12. By accessing the asset listing sites 20 the acquiring entity is able to engage in conducting searching activities at block 304. For example, the acquiring entity may use the platform 10 to find suitable sites 20 to begin their home buying journey by exploring prices and inventory in a certain geographic area.

At block 306, the platform 10 may use access to the asset listing site(s) 20 via the API 21 to monitor and store asset search data 26 that can be associated with corresponding client profile data 24 in the datastore 22. This enables the platform 10 to provide the asset search data 26 and any relevant client profile data 24 to the recommendation engine 36 at block 308. The platform 10 may then use the recommendation engine 36 to generate search criteria and provide or otherwise utilize same with one or more asset listing sites 20 at block 310. It will be appreciated that, as indicated in dashed lines, block 310 may be executed separately from blocks 300 to 308 and/or at a later point in time. It will also be appreciated that block 310 may be executed using the same asset listing site(s) 20 (e.g., to monitor certain properties or look for new properties), and/or using one or more sites 20 not previously used by the acquiring entity or observed by the platform 10 in generating the asset search data 26.

At block 312, the asset listing site(s) 20 use the search criteria provided by the platform 10 to conduct one or more searches using the search criteria, to obtain search results (which may include evaluating and ranking or recommending listings in the search results) and return those to the platform 10 at block 314.

At block 316, the platform 10 receives the new search results and may notify the acquiring entity, e.g., of new assets to consider, new prices associated with previously searched assets, among other information that can be extracted from the new search results. For example, the acquiring entity can be notified when a price reduction occurs, statistics regarding acquisition values, when a listing becomes inactive (e.g., if it has been sold), etc.

Referring to FIG. 7, an example embodiment of computer executable instructions for executing searching and recommendation processes is shown. At block 400 the platform 10 initiates the recommendation engine 36 as herein described. At block 402, the recommendation engine 36 uses the databases interface module 34 to access the client profile data 24 associated with the acquiring entity or more generally the user as herein described. It will be appreciated that block 402 may also include accessing financial data 18, either separately or from financial data 18 stored in the client profile data 24 by the platform 10.

At block 404, the recommendation engine 36 may also use the databases interface module 34 to access the asset search data 26 for each asset listing site 20 that is associated with the acquiring entity and that is to be analyzed for the searching and recommendation process. The recommendation engine 36 uses the machine learning engine 38 to execute machine learning processes at block 410 as herein described. This may include analyzing the data accessed in blocks 402 and 404 to classify data such that relevant parameters can be identified and used to determine a highest match between the content in the client profile data 24 and the content in the search data 26 to determine one or more new search queries at block 406. The process implemented at block 406 may be used to generate and utilize one or more sets of search criteria with one or more asset listing sites 20 to obtain content for one or more relevant notifications for the acquiring entity at block 408. At block 408, various searching and monitoring processes can be utilized as described herein. It will be appreciated that the recommendation engine 36 may also be executed on the new search results to evaluate or recommend certain listings in those search results.

In addition to sending the notifications to the acquiring entity, the platform 10 may also enable appointment booking and reminders regarding the acquisition process at block 412. For example, after sending a notification of additional search results or an update to a previously searched asset, the acquiring entity may utilize the platform 10 to begin chatting with interested parties and proceed further in the acquisition process. For example, in searching for a home, the acquiring entity may wish to schedule a viewing, make an offer, or conduct additional searching for comparison pricing, etc. The platform 10 may therefore also provide the communications tool 46 at block 414, to enable the acquiring entity to communicate with interested party devices 28.

At block 416, the platform 10 determines whether a new search is to be conducted. This may be triggered by activities of the acquiring entity or may be periodically performed automatically by the platform 10. If a new search is to be conducted, the process may be repeated by returning to block 400. If a new search is not to be conducted, the process ends at block 418.

Figure 8:
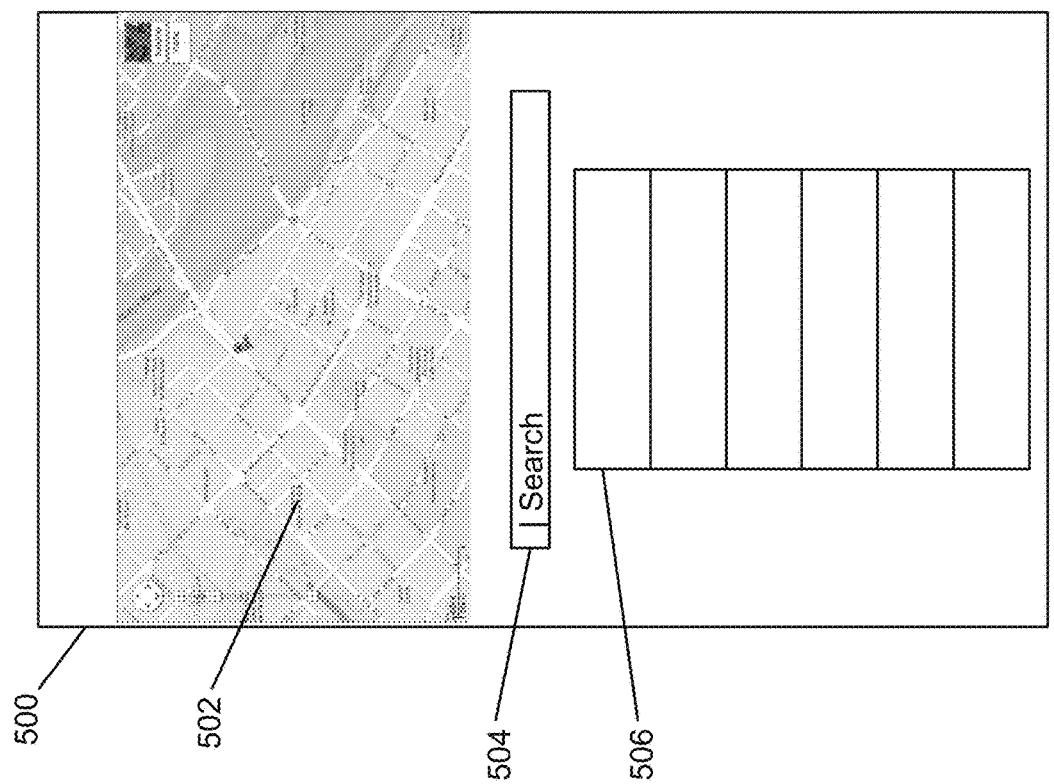
FIG. 8 is an example of a graphical user interface of a real estate listing search tool.

Referring to FIG. 8, an example of a GUI of a real estate listing search tool 500 is shown. The GUI 500 may include a search entry box 504, a map output 502, and a search results list 506. By engaging in the search activities as illustrated in FIG. 8, the platform 10 through the API 21 may monitor and store search activities as herein described.

Referring to FIG. 9, an example of a GUI of a search notification 604 is shown. In the example embodiment shown in FIG. 9, an application GUI 600 is shown without any details provided to indicate that the notification 604 may be displayed as an alert in or over any application portion 602, including the asset listing application 68, financial institution application 70 or web browser application 72 shown in FIG. 3. The notification 604 may include any suitable notification text, such as in this example: "We have some search results for you. Click here:". The notification 604 may also include a link 606 to access the content associated with the notification 604, in this example a set of new search results obtained for the acquiring entity by the platform 10. It can be appreciated that the notification 604 can also be displayed by another entity such as the financial institution system 16 with the link directing the user to the platform 10. That is, the platform 10 can be a stand-alone entity, or can be integrated, affiliated or provided by another entity, such as an entity already known to the user (e.g., a financial institution).

Referring to FIG. 10, an example of a GUI of a home buying dashboard 700 is shown. The home buying dashboard 700 may be provided via the asset listing application 68. The home buying dashboard 700 is associated with the client device 12 and its user, and in this example embodiment identifies the user with a user profile image 702 containing the letter "C". It will be appreciated that the user profile image 702 may be a character, avatar, photo, emoji, or other visual element. The dashboard 700 also includes a Search for Homes option 704 that may be used to initiate access to an asset listing site 20.

The dashboard 700 also includes a Calendar option 706 that may be used to provide access to the appointment scheduling tool 48 of the platform 10 or an integrated or associated other calendar such as a user calendar. The dashboard 700 may also include a DOCS option 708, which may be selected to access a document sharing tool (not described herein), and a CHAT option 710, which may be selected to access the communications tool 46. A series of profile images 712 for other connections (e.g. interested parties) may also be displayed, with each image 714 being populated (shown in dashed grey in FIG. 10 to illustrate a yet-to-be-added connection) as interested parties are connected via the platform 10. It will be appreciated that the platform 10 may also be used to connect and interface the acquiring entity with other advisors, as described in co-pending U.S. patent application Ser. No. 16/275,087 filed on Feb. 13, 2019 and entitled "System and Method for Interfacing Entities Engaged in Property Exchange Activities", the contents of which are incorporated herein by reference. It will also be appreciated that the platform 10 may have the acquiring entity connect and interface with a realtor before other advisors, according to processes described in co-pending U.S. patent application Ser. No. 16/275,178 filed on Feb. 13, 2019 and entitled "System and Method for Interfacing Acquiring Entities and Realtors", the contents of which are incorporated herein by reference.

Referring to FIG. 11, an example of a GUI of an appointment notification 804 is shown. In the example embodiment shown in FIG. 11, an application GUI 800 is shown without any details provided to indicate that the notification 804 may be displayed as an alert in or over any application portion 802, including the asset listing application 68, financial institution application 70 or web browser application 72 shown in FIG. 3. The notification 804 may include any suitable notification text, such as in this example: "Your viewing has been scheduled. See calendar:". The notification 804 may also include a link 806 to access the calendar appointment associated with the notification 804. It will be appreciated that the platform 10 may therefore engage with the acquiring entity to assist with next steps in the acquisition process. For example, specific actions or events may be captured in a calendar as shown in FIG. 11, and/or other general reminders may be generated. For example, periodic reminders regarding what the acquiring entity should be doing next may be provided to assist them in the acquisition process. One example reminder may include a reminder to obtain a pre-approval for a mortgage, schedule an inspection once a viewing has been arranged, etc. It can be appreciated that the notification 804 can also be displayed by another entity such as the financial institution system 16 with the link directing the user to the platform 10. That is, the platform 10 can be a stand-alone entity, or can be integrated, affiliated or provided by another entity, such as an entity already known to the user (e.g., a financial institution).

FIG. 12 is an example embodiment of a GUI of a virtual chat session 900 provided via the communications tool 46. The chat session 900 allows the acquiring entity (denoted as the "Client" in this example) to communicate with entities in the computing environment 8 such as interested party devices 28. In FIG. 12, a first client message 902 is sent, which indicates: "@Realtor, I am ready to see this listing . . . " with a link to a listing. By having a realtor interfaced as an interested party via the platform 10, the acquiring entity may receive a first realtor message 904 indicating: "Sounds good, I will book a viewing". In this example, the platform 10 detects or is notified of a booking for the viewing, generates an appointment for the appointment scheduling tool 48, and issues a platform message 906 indicating: "Your viewing has been booked . . . " with a link 908 to the appointment. It will be appreciated that the platform message 906 provides a similar function as the notification 804 in FIG. 11.

The access control module 44 may be used by the communications tool 46 to selectively control what data and information is seen by certain entities communicating through the communications tool 46. For example, an acquiring entity may include potentially sensitive information in a message directed to a realtor, lawyer, or mortgage broker, but wish to add additional parties to a group chat. Rather than begin a new chat or to communicate via multiple chats, the platform 10 may use the access control module 44 to selectively redact or alter message content as seen from different perspectives.

FIG. 13 is an example embodiment of a GUI of another virtual chat session 920A provided via the communications tool 46, from the perspective of the acquiring entity. In this example, a client message 922A includes the following content: "Search results look good. My budget is $500 k, I have $150 k in income". A realtor message 924A indicates: "Sounds good, I will book some viewings!", a sibling message 926A indicates: "Agreed, but remember you hate to renovate . . . ", an inspector message 928A indicates: "I can be available next week for an inspection . . . ", and a mortgage broker message 930A indicates: "I will get the pre-approval now!". Since the acquiring entity is the owner of the content in the client message 922A, it may view the entire content from its perspective. In this example embodiment, it is assumed that this content includes at least some potentially sensitive information that the platform 10 identifies (e.g., using the machine learning engine 38) and selectively redacts or alters for each of the other perspectives in the chat, where appropriate.

FIG. 14 is an example embodiment of a GUI of the virtual chat session 920B, from the perspective of a realtor. Each message 922-930 includes the suffix "B" to indicate its version from the perspective of the realtor. In this example, the client message 922B is altered when compared to FIG. 13 wherein a content portion 932B indicates an income range rather than an exact income. This is illustrative of an alteration to the content of the message that takes into account that the realtor, as a "secondary participant type", does not require exact income (at least at this stage of the process) but may require an income range to assess financial viability of the home search and budget. The other messages 924B, 926B, 928B, and 930B include the same content, but are aligned to indicate incoming messages.

FIG. 15 is an example embodiment of the virtual chat session 920C, from the perspective of an inspector. Each message 922-930 includes the suffix "C" to indicate its version from the perspective of the inspector. In this example, the client message 922C is altered when compared to FIGS. 13 and 14, wherein another content portion 932C indicates a broad price range rather than a budget. Moreover, it may be seen that the content portion 932B is not seen by the inspector. These are illustrative of alterations to the content of the message that takes into account that the inspector does not income data at all and may only require a broad range of budget to assess the scope of their inspection. The other messages 924C, 926C, 928C, and 930C include the same content, but are aligned to indicate incoming messages.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A server device for searching and monitoring assets available for acquisition, the device comprising:
    a processor;
    a communications module coupled to the processor; and
    a memory coupled to the processor, the memory storing computer executable instructions that when executed by the processor cause the processor to:
        store search data automatically generated for an acquiring entity by at least one of a plurality of listing services based on search queries made by the acquiring entity using the at least one of the plurality of listing services;
        store client profile data associated with the acquiring entity;
        determine at a later time that the client profile data associated with the acquiring entity has changed since the search data was automatically generated;
        provide a model trained to generate search queries, the model trained to receive (1) output from a recommendation engine and (2) search results, the recommendation engine classifying client profile data to generate recommendations from search results;
        generate at least one modified search query with the model by inputting the stored search data and the changed client profile data;
        perform, on behalf of the acquiring entity, new or additional searching of assets listed in the plurality of electronic listing services using the at least one modified search query, by connecting to an additional electronic listing service and automatically executing the at least one modified search query; and
        automatically generate a result list of matched assets for the acquiring entity based on the at least one new search query.

2. The device of claim 1, wherein the computer executable instructions further cause the processor to:
    provide an electronic platform comprising a first interface for the acquiring entity;
    provide access to the plurality of electronic listing services via the first interface, the first interface providing respective application programming interfaces with the plurality of electronic listing services; and
    obtain the search data from interactions associated with the access provided to the at least one electronic listing service via the electronic platform.

3. The device of claim 1, wherein the computer executable instructions further cause the processor to:
    send an electronic notification related to the result list to a client device associated with the acquiring entity.

4. The device of claim 3, wherein the electronic notification comprises at least one of statistics regarding acquisition values for assets matching particular criteria, a listing for a particular asset, and an indication that a previously searched asset has been acquired.

5. The device of claim 1, wherein the computer executable instructions further cause the processor to:
    periodically update the client profile data to account for changes in the financial data associated with the acquiring entity.

6. The device of claim 5, wherein the financial data associated with the acquiring entity comprises a financial viability metric associated with a value or value range for the assets being searched.

7. The device of claim 2, wherein the electronic platform provides a graphical user interface configured to provide at least one reminder associated with a step in the acquisition process.

8. The device of claim 7, wherein the graphical user interface provides an appointment tool for scheduling at least one event associated with the acquisition process.

9. The device of claim 8, wherein the electronic platform provides at least one interface to connect the acquiring entity with at least one advisor entity, the at least one advisor entity being scheduled for the at least one event using the appointment tool.

10. The device of claim 2, wherein the electronic platform provides a chatroom interface to enable at least one secondary participant to correspond with the acquiring entity.

11. The device of claim 2, wherein the electronic platform is configured to generate at least one recommendation for at least one advisor.

12. A method of searching and monitoring assets available for acquisition, the method executed by a device having a processor and comprising:
storing search data automatically generated for an acquiring entity by at least one of a plurality of listing services based on search queries made by the acquiring entity using the at least one of the plurality of listing services;
storing client profile data associated with the acquiring entity;
determining at a later time that the client profile data associated with the acquiring entity has changed since the search data was automatically generated;
providing a model trained to generate search queries, the model trained to receive (1) output from a recommendation engine and (2) search results, the recommendation engine classifying client profile data to generate recommendations from search results;
generating at least one modified search query with the model by inputting using the stored search data and the changed client profile data;
performing, on behalf of the acquiring entity, new or additional searching of assets listed in the plurality of electronic listing services the at least one modified search query, by connecting to an additional electronic listing service and automatically executing the at least one modified search query; and
automatically generating a result list of matched assets for the acquiring entity based on the at least one new search query.

13. The method of claim 12, further comprising:
providing an electronic platform comprising a first interface for the acquiring entity;
providing access to the plurality of electronic listing services via the first interface, the first interface providing respective application programming interfaces with the plurality of electronic listing services; and
obtaining the search data from interactions associated with the access provided to the at least one electronic listing service via the electronic platform.

14. The method of claim 12, further comprising:
sending an electronic notification related to the result list to a client device associated with the acquiring entity.

15. The method of claim 14, wherein the electronic notification comprises at least one of statistics regarding acquisition values for assets matching particular criteria, a listing for a particular asset, and an indication that a previously searched asset has been acquired.

16. The method of claim 12, further comprising:
periodically updating the client profile data to account for changes in the financial data associated with the acquiring entity.

17. The method of claim 16, wherein the financial data associated with the acquiring entity comprises a financial viability metric associated with a value or value range for the assets being searched.

18. The method of claim 13, wherein the electronic platform is configured to generate at least one recommendation for at least one advisor.

19. A non-transitory computer readable medium for searching and monitoring assets available for acquisition, the computer readable medium comprising computer executable instructions for: storing search data automatically generated for an acquiring entity by at least one of a plurality of listing services based on search queries made by the acquiring entity using the at least one of the plurality of listing services; storing client profile data associated with the acquiring entity; determining at a later time that the client profile data associated with the acquiring entity has changed since the search data was automatically generated; providing a model trained to generate search queries, the model trained to receive (1) output from a recommendation engine and (2) search results, the recommendation engine classifying client profile data to generate recommendations from search results; generating at least one modified search query with the model by inputting the stored search data and the changed client profile data; performing, on behalf of the acquiring entity, new or additional searching of assets listed in the plurality of electronic listing services the at least one modified search query, by connecting to an additional electronic listing service and automatically executing the at least one modified search query; and automatically generating a result list of matched assets for the acquiring entity based on the at least one new search query.

20. The device of claim 1, wherein the instructions cause the processor to: provide the result list of matched assets to the recommendation engine; and generate a recommended list of matched assets based on the output of the recommendation engine.

* * * * *